United States Patent [19]

Strong

[11] 4,132,488
[45] Jan. 2, 1979

[54] COMPRESSIBLE BOW ADJUSTER

[76] Inventor: Howard D. Strong, 119 Chardon Ave., Chardon, Ohio 44024

[21] Appl. No.: 906,628

[22] Filed: May 16, 1978

[51] Int. Cl.$^2$ ................................................ F16B 7/06
[52] U.S. Cl. ..................................... 403/60; 403/118; 135/6; 9/1.5
[58] Field of Search .................... 403/60, 118, 166; 135/15 PQ, 6; 9/1.5, 5

[56] References Cited

U.S. PATENT DOCUMENTS

| 2,280,729 | 4/1942 | Sutton | 9/1.5 |
| 2,829,660 | 4/1958 | Webster et al. | 135/6 |
| 3,036,350 | 5/1962 | Hunt | 403/166 |
| 4,063,833 | 12/1977 | Strong | 403/60 |

*Primary Examiner*—Andrew V. Kundrat
*Attorney, Agent, or Firm*—Larson, Taylor and Hinds

[57] ABSTRACT

A bow adjuster for adjusting the bows that support, for example, the fabric top of a boat, to ensure the proper fit of the material over the support bows. The bow adjuster can adjust the bows to accomodate changes in the material due to stretching or shrinking brought on by ageing or various environmental conditions. In addition, the bow adjuster can be compressed upon the application of a sufficient force to the bow. The bow adjuster includes a bushing which is fitted into one end of a fabric supporting bow. A threaded rod is threaded into the bushing with the opposite end of the rod being slidably fixed within a cylindrical tube. The tube includes a sleeve which telescopes over the end of the fabric supporting bow. The end of the cylindrical tube is mounted on a deck cleat so that the bow adjuster comprises an adjustable and compressible link between the fabric supporting bow and the deck. Rotation of the sleeve causes rotation of the threaded rod to move the fabric supporting bow towards or away from the deck cleat to maintain the fabric in a taut condition.

5 Claims, 2 Drawing Figures

COMPRESSIBLE BOW ADJUSTER

FIELD OF THE INVENTION

This invention relates to bow adjusters and more particularly, to adjusters for bows that support, for example, the fabric top of a boat and insure proper fabric fit.

BACKGROUND OF THE INVENTION

As was discussed in my prior U.S. Pat. No. 4,063,833, there are a variety of prior art devices to adjust the length of a member. One such device is disclosed in U.S. Pat. No. 253,313, where an elongate coupling sleeve joins a rod with a right screw thread to a rod with a left screw thread, the rods being colinear. The rotation of the sleeve in one direction draws the rods together along their common axis and the rotation of the sleeve in the opposite direction pushes the rods apart. Thus, the overall length of the rods in this colinear arrangement can be adjusted. A disadvantage with the arrangement is the threads on the rods are not always covered by the sleeve, as, for example, when the rods are fully extended out of the sleeve. The threads so exposed, are susceptible to a corrosive environment. Additionally, any lubricating fluids placed on the exposed threads tend to become removed therefrom by, for example, the threads being rubbed against another object. Further, exposed threads create a safety hazard in that, for example, fingers can be caught between the threads and the sleeve as the rods are pulled into the sleeve.

SUMMARY OF THE INVENTION

The present invention provides a bow adjuster that includes an elongate threaded rod and an elongate cylindrical sleeve mounted concentrically about the threaded rod. A bushing that receives the threaded rod is fitted into one end of the end of a fabric supporting bow. The diameter of the cylindrical sleeve is large enough to accept the bow drawn coaxially therein as the threaded rod and sleeve are rotated so that the bushing progresses along the threaded rod.

A feature of the invention is the spring mounting of the threaded rod in the sleeve. While the threaded rod will rotate when the sleeve is rotated, the threaded rod can also slide further into the sleeve upon application of a force sufficient to overcome the spring. This allows the bow to slide into the bow adjuster when a sufficient force is applied.

Another feature of the invention is a swivel bracket rotatably mounted on the sleeve so that the axis of rotation of the bracket is colinear with the elongated threaded rod. This bracket allows the sleeve to be secured to a foundation while remaining rotatable.

The sleeve protectively covers the threaded rod and thus the disadvantages associated with the prior art are avoided. The threaded rod is protected from corrosive forces and additionally, lubrication fluids applied to the threads cannot be rubbed therefrom. Also, an unsafe condition, created by exposed threads is eliminated.

Additional features and advantages of the invention will be set forth in, or apparent from, the detailed description of the preferred embodiments of the invention found hereinbelow.

DETAILED DESCRIPTION OF THE PREFERRED EMBODIMENTS

Figure 1:
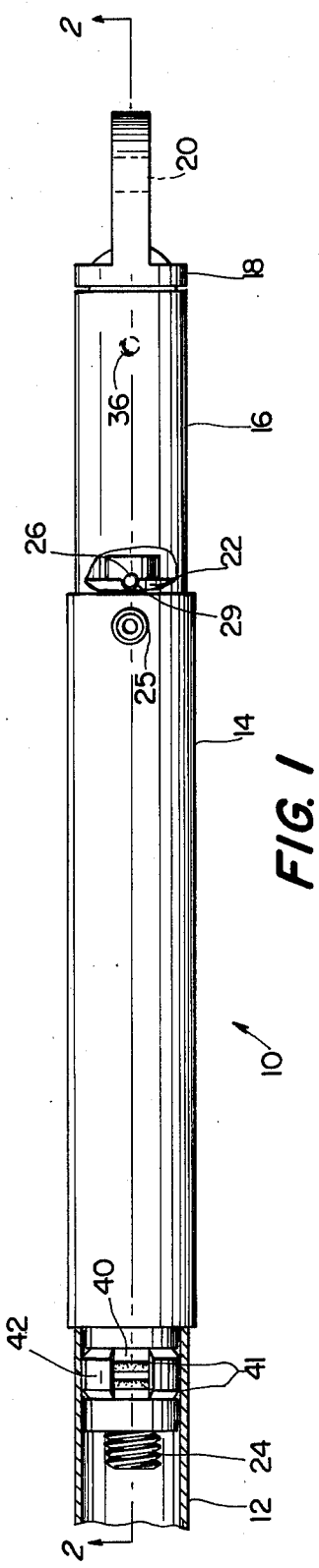
FIG. 1 is a plan view of the bow adjuster.

Referring to the Figures, a bow adjuster 10 is depicted in combination with a portion of a cylindrical, tubular bow 12. The bow 12 may be the end portion of a bow supporting fabric top, such as, for example, the fabric top of a boat. Normally, the end of the bow would be mounted on a deck bracket. However, to provide for adjusting the tautness of the fabric top and to allow the bow to be compressed upon the application of sufficient force, the presently disclosed bow adjuster is interposed between the bow end and the deck bracket. Bow adjuster 10 includes an elongate cylindrical sleeve 14 that telescopically receives bow 12 at one end thereof and elongate sleeve 14 is fit over a cylindrical tube 16 at the other end thereof. A swivel bracket 18 with an aperture 20 therethrough is rotatably mounted on the distal end of the tube 16 so as to have an axis of rotation generally colinear with the longitudinal axis of elongate sleeve 14.

Figure 2:
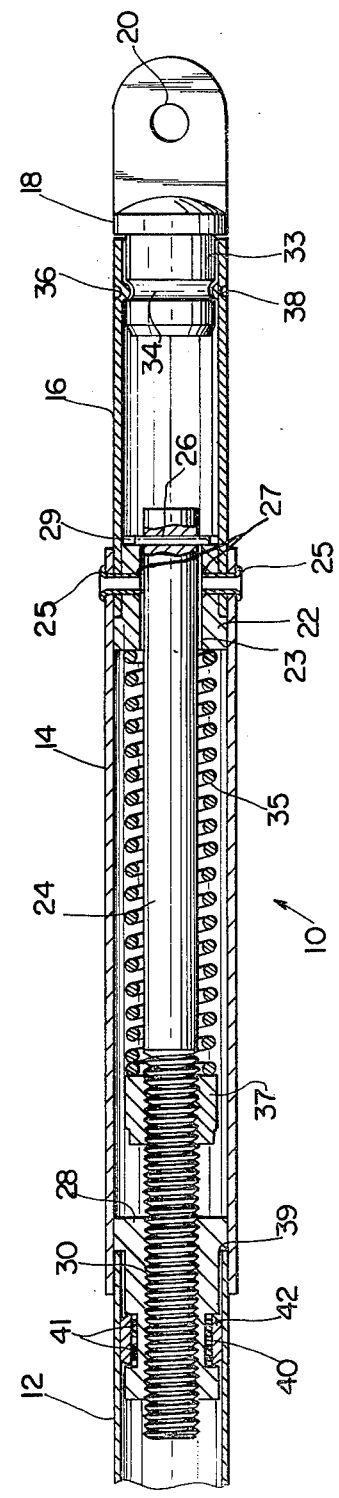
FIG. 2 is a cross-sectional view taken along line 2—2 in FIG. 1.

Referring to FIG. 2, bow adjuster 10 is depicted in cross-section. A first bushing 22 with a bore 23 is fit into tube 16 and both tube 16 and first bushing 22 are fit into sleeve 14. Rivets 25 are passed through the walls of the sleeve 14, the tube 16 and the first bushing 22 to rigidly attach the three parts together. To allow for the head of the rivet 25 to be flush with or indented from the bore 23 of the first bushing 22, a slight depression or enlarged hole 27 is provided for the head of the rivet 25.

An elongate threaded rod 24 is slidably mounted in the bore 23 of first bushing 22 so as to be coaxial with the sleeve 14. A pin 26 with a length somewhat longer than the diameter of the bore 23 is positioned generally perpendicularly through the end of rod 24. This pin engages the first bushing 22 and rests in a U-shaped trough 29 formed in the end of first bushing 22 closest to the swivel bracket 18. Engaging the other side of the first bushing 22 is a spring 35 coaxially mounted on rod 24 which urges the pin 22 into the trough 29. The spring 35 is held in compression, but not fully compressed, by a threaded nut 37 on the elongate rod 24 and the first bushing 22. It should be noted that when a force sufficient to overcome the force of spring 35 is applied to the elongate rod 24, the elongate rod will move through first bushing 22 towards the swivel bracket 18.

Bow adjuster 10 further includes a second bushing 28 with a threaded bore 30 therein. Threaded bore 30 of second bushing 28 receives the distal end of threaded rod 24. Second bushing 28 has a groove 40 in which lie two compressible O-rings 41. Also carried in groove 40 and resting on top of O-rings 41 is an open collar 42 with chamfered sides.

The bow 12 fits over the collar 42 which is axially compressed against the O-rings. It can be seen because of this ability to be axially compressed, the collar 42 can receive different sized bows. The bow 12 is pushed down on second bushing 28 until it engages shoulder 39 of second bushing 28. The second bushing 28 is then resiliently held fixed with respect to bow 12 by the collar 42 and compressed O-rings 41. The outer diameter of bow 12 is smaller than the inner diameter of cylindrical sleeve 14, so that sleeve 14 can slide over bow 12.

As best depicted in FIG. 2, the distal end of tube 16 receives a cylindrical portion 33 of swivel bracket 18. Cylindrical portion 33 includes a circumferential groove formed therein. Swivel bracket 18 is retained in tube 16 by bosses 36 and 38 that extend into groove 34. Bosses 36 and 38 can be formed, for example, by mechanically punching a portion of tube 16 into groove 34. As swivel bracket 18 rotates, bosses 36 and 38 travel in groove 34. Bow adjuster 10, except for O-rings 41, can be comprised of, for example, metallic elements. In the alternative, several of the elements such as, for example, the bushings and swivel bracket may be comprised of tough plastic.

The operation of bow adjuster 10 in combination with the bows supporting the fabric top of a boat is as follows. The bows, with a fabric covering, are erected. Aperture 20 is secured to a deck bracket of the boat. Sleeve 14 is rotated about its longitudinal axis causing the second bushing 28, held non-rotatably in bow 12 by the collar 42 and O-rings 41, to progress along threaded rod 24, either towards or away from the first bushing 22. As this occurs, the bow may be moved towards or away from the deck so as to maintain the fabric top covering the bows taut.

It should be noted that sleeve 14 causes the elongate rod 24 to be rotated due to the pin 26 passing through the rod 24 and held in trough 29 by the force of spring 35. Should the force exerted on the bow 12 exceed the force of spring 35 the elongate rod 24 will move through the first bushing 22 and the pin 26 will be moved out of the trough 29. This movement of the elongate rod 24 and the pin 26 acts as an upper limit to the tautness which can be exerted on the fabric.

With the pin out of the trough, the rotation of sleeve 14 will not be transfered along to the elongate rod 24 and therefor bow 12 will not extend any further. Likewise, should shrinking due to ageing occur and exert a tautness force on the fabric beyond the force of the spring, the force of shrinking would be absorbed by the further compression of the spring and movement of the rod 24 rather than resulting in a greater tautness of the fabric.

The compressible action of the spring 35 also acts to produce a non-rigid support. Therefore, if an object strikes the fabric top, the bow adjuster 10, as well as the fabric, will have some "give". With a rigid bow support, either the fabric would give and possibly tear, or the bow support might be bent. The bow adjuster may also be compressed momentarily should a slack fabric top be required, for example, when a corner of the fabric top needs to be attached when the fabric top is already taut.

The bow adjuster, as is evident from the previous discussion, can accomodate material stretching or shrinking due to ageing of the material or to environmental conditions. Besides being manually adjustable, the bow adjuster maintains an inherent maxiumum force which it can exert on the fabric, or the fabric exert on it.

Although the present invention has been described relative to an exemplary embodiment thereof, it will be appreciated by those skilled in the art that modifications and variations can be effected in these embodiments without departing from the scope or spirit of the invention.

I claim:

1. An adjuster for adjusting the length of a bow comprising:
   an elongate threaded rod;
   a cylindrical sleeve;
   means for mounting said sleeve on said rod with said sleeve extending coaxially about said threaded rod, said mounting means including a first bushing having a bore slidably receiving said threaded rod, a pin through one end of said threaded rod having a length greater than the diameter of the bore, said pin engaging one end of the bushing, a spring member coaxially mounted on said threaded rod engaging the opposite end of said first bushing and biasing said threaded rod to urge said pin into engagement with said first bushing, said first bushing being fixedly attached to a first end of said sleeve;
   swivel bracket means rotatably mounted on said sleeve, the axis of rotation of said bracket means being colinear with the longitudinal axis of said elongated threaded rod;
   a second bushing having a threaded bore that receives said threaded rod, said second bushing attached to the end of a bow, the end of the bow being telescopically received within a second end of the sleeve, said sleeve being rotatable so that said second bushing progresses along said threaded rod relative to said mounting means; and
   whereby the bow length may be adjusted by rotating the sleeve and whereby the bow length may be shortened upon the application of a sufficient force on the bow which causes said elongate threaded rod to slide through said first bushing as said spring member is compressed.

2. An adjuster for adjusting the length of a bow according to claim 1 wherein said swivel bracket means includes a tubular member and a cylindrical portion having a circumferential groove, said cylindrical portion being received in the end of said tubular member, said end of tubular member including bosses for extending into said groove from the interior surface of said tubular member for retaining said cylindrical portion therein while allowing said tubular member to rotate.

3. An adjuster for adjusting the length of a bow according to claim 1 wherein said first bushing includes a trough in one end for receiving said pin.

4. An adjuster for adjusting the length of a bow according to claim 1 wherein said second bushing includes means to resiliently hold said second bushing stationary within the bow.

5. An adjuster for adjusting the length of a bow according to claim 4 wherein said resilient holding means comprises:
   a compressible O-ring encircling said second bushing;
   an open collar covering said O-ring;
   whereby said collar may be axially compressed around said O-ring and said second bushing, so as to receive different sized bows.

* * * * *